April 12, 1938.  E. A. EVERETT  2,113,723
DRILLING MACHINE
Filed Jan. 6, 1934   5 Sheets-Sheet 3

April 12, 1938. E. A. EVERETT 2,113,723
DRILLING MACHINE
Filed Jan. 6, 1934 5 Sheets-Sheet 5

INVENTOR
Edward A. Everett
BY
M. Loughridge
ATTORNEY

Patented Apr. 12, 1938

2,113,723

UNITED STATES PATENT OFFICE 2,113,723

DRILLING MACHINE

Edward A. Everett, Long Island City, N. Y.

Application January 6, 1934, Serial No. 705,531

25 Claims. (Cl. 77—8)

This invention relates to drilling machines and has for an object to provide a mechanism for operating a drill spindle for drilling holes and for feeding the drill to the work, the feeding mechanism comprising means for retracting the drill after the hole has been drilled to a predetermined depth; another object of the invention is to provide a drilling mechanism in which the drill is fed to the work in a plurality of stages and retracted in one stage after drilling holes to a predetermined extent; another object of the invention is to provide a drilling mechanism in which the drill is fed to the work by a cam and retracted from the work by the action of this cam and also having means whereby the drill may be fed to the work by a screw; another object of the invention is to provide a drill head movable about a fixed support to change the position of the drill and in which the feed of the drill is changed as the position of the drill head is changed; another object of the invention is to provide a movably mounted drill head with a drill fed to the work in two stages and means for controlling the feed of the drill automatically in one position and controlling it manually when the drill head is in another position.

Another and more particular object of the invention is to provide a drilling machine for drilling railway rails in the trackway for the application of electric bonds for maintaining the track circuit around the rail joints, one type of bond is applied to the ball or head of the rail and another type is applied to the web of the rail and the present machine is adaptable for drilling the rail for both of these conditions and also for drilling spaced holes close to the ends of the rails.

The machine comprises a clamping mechanism which, by a cam action, secures a guide or grooved track upon the top of the rail and to this track the drilling machine is clamped by an adjustable clamp so that it may slide horizontally on the track to space the drill horizontally with relation to the rail.

The clamping mechanism is secured to the rail by a cam which is operated by a lever terminating in a handle which the operator grips when operating the machine and by applying downward pressure on this handle the clamp is secured to the rail, whereas by applying upward pressure to the handle the clamp is released from the rail and, by the same action, the machine is removed from the track, which is a matter of some importance in case it is necessary to clear the track for an approaching train.

The drilling mechanism comprises a crank-operated drive connected with the part of the frame which is secured to the rail clamp and which terminates in a fixed cylindrical member about which the drill head rotates. The drill head contains the drill spindle with the drill, a gear connecting it with the driving gear and the feeding mechanism for the drill. When the drill head is positioned to drill the ball of the rail the feeding action is controlled by a cam which retracts the drill after a predetermined depth or number of revolutions of the drill has been reached, the holes in this case being comparatively shallow and being required of a uniform depth. When the mechanism is to drill the web of the rail, the drill head is lowered to register the drill with the position required and is locked in position while the drill is operated. In one form of the invention the drill is screw fed when drilling the web of the rail and is retracted by a manually operated lever. By a cam action, changing the position of the drill head automatically changes the extent of the drill feed so that the machine adjusts itself for drilling shallow holes in the head of the rail and drilling deeper holes through the web of the rail as the drill head is adjusted to conditions.

The machine also includes a gauging member for locating the position of the drill relative to the end of the rail.

The invention has been applied to the operation of a drill but it should be understood that any other type of tool may be substituted for the drill that can be applied in a similar manner.

Further objects of the invention and the details of construction will be understood from the following specification and the accompanying drawings, in which:

Fig. 2 is a front elevation of the machine from the clamp side;

Fig. 10 shows an end view of the sliding arm used to operate the change-over mechanism, and, Fig. 11 shows a side view of the sliding arm operated by the cam in Fig. 7a of the change-over mechanism.

Rail drilling machine

Figures 1, 1A, 1B:
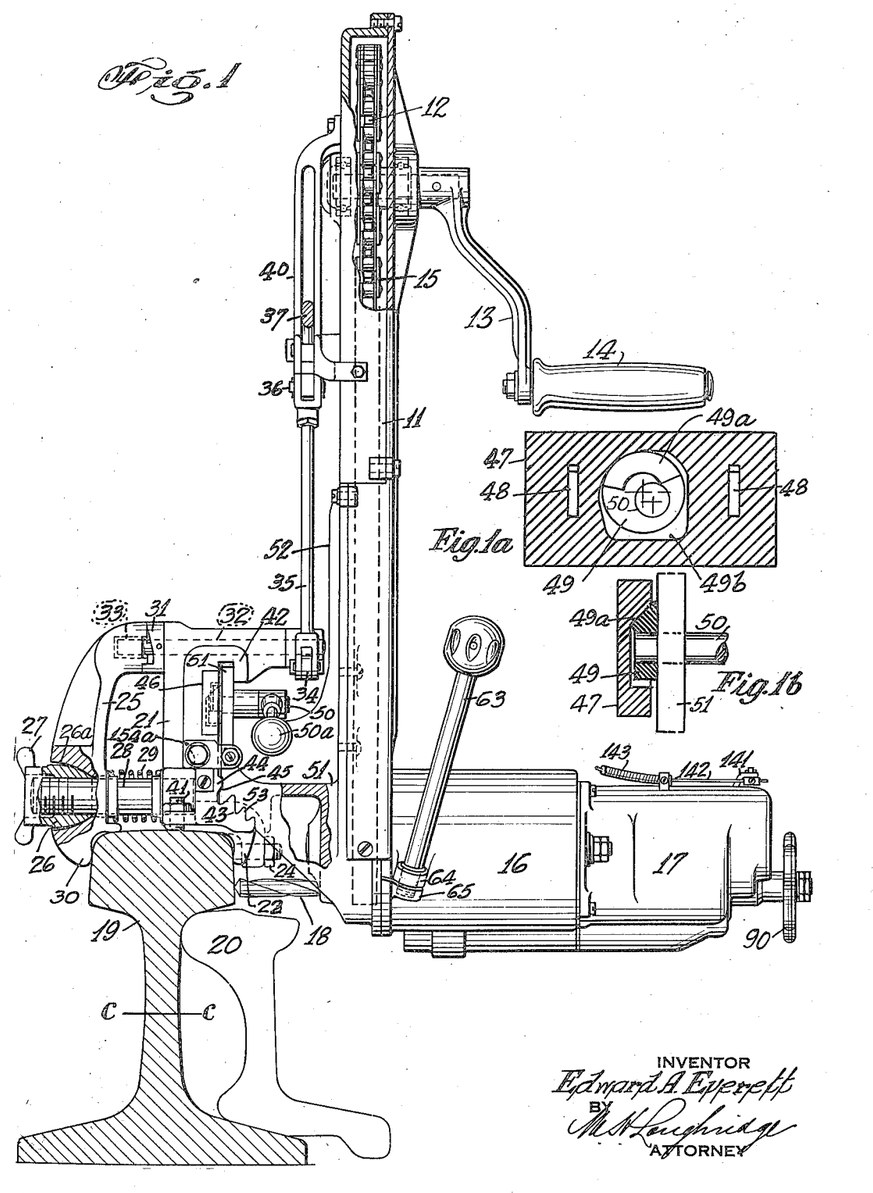
Fig. 1 is a vertical side elevation of the machine applied to a railway rail in which certain parts are sectioned to show the construction.
Figs. 1a and 1b are sectional details of the locking support.
Figures 2, 10, 11:
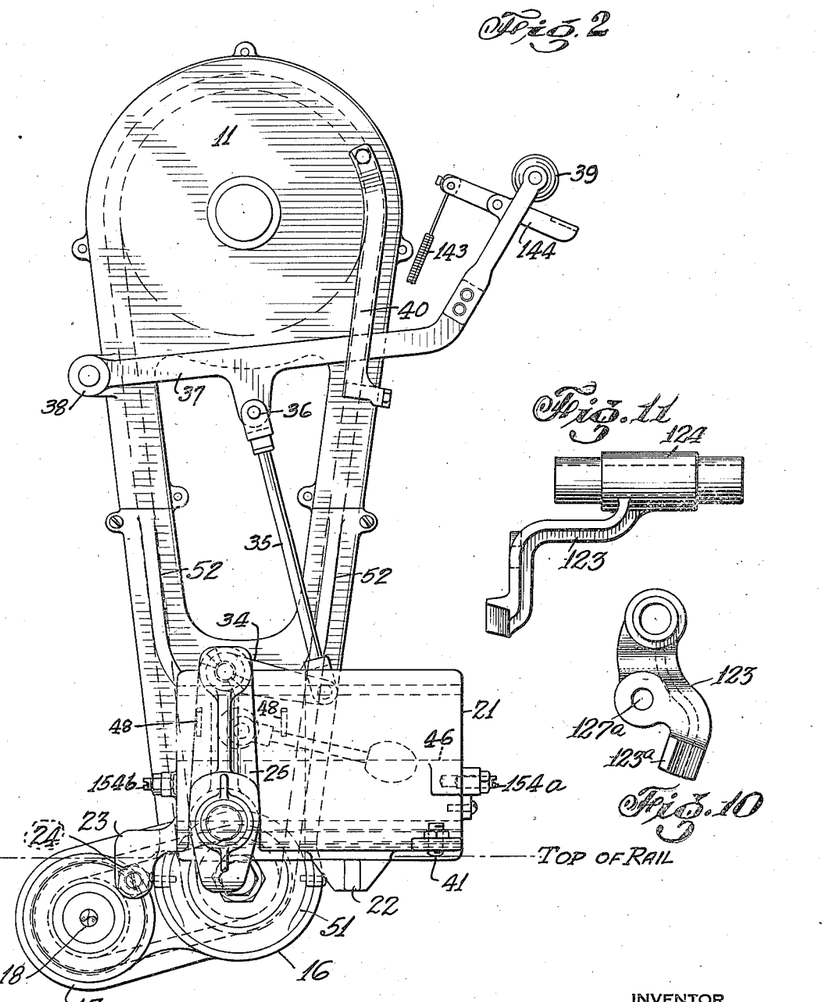

In Figs. 1, 2 and 3, 11 indicates the upstanding part of the frame of the machine which encloses a chain wheel 12, mounted on the shaft of the crank 13 and operated by the handle 14. The chain 15 engaging wheel 12, constitutes the drive and engages the chain gear 69, Fig. 4, hereafter described. The frame 11 is mounted upon the fixed frame 51, with the gear box 16 and on this gear box the drill head 17 is rotatably mounted carrying the drill 18, which, as shown in Fig. 1 and Fig. 2 is positioned to drill the ball of the rail 19 above the splice bar 20.

Rail clamp

The rail clamp comprises the vertical plate 21 which is positioned on top of the rail and has a depending lug 22 at one end and another lug 23, with an adjusting screw 24, at the other end arranged to engage one side of the rail head and opposing these lugs is the clamp member 25 which is pivotally mounted on the ball and socket mounting at 26, which is adjusted by the nut 27 to different widths of rail, and is connected by the stem 28 with the plate 21 and retracted by the coil spring 29. The lower end of the clamp member 25 is formed as indicated at 30 to engage the head and the side of the rail and is brought into the engaging position by the cam 31, mounted on shaft 32 and rotated by crank 34, connected by rod 35, which is pivotally connected at 36 with the lever 37, this lever being pivoted to the frame at 38 and terminating in the handle 39 and guided by the guide member 40 secured to the frame. The operation of the clamp will be understood by considering the operator operating the machine by one hand through the handle 14 and with the other steadying the machine and himself by pressing down on the handle 39. The downward pressure on 39 causes the cam 31 to move the upper end of 25 outwardly which, pivoting on the socket maintains a rigid grip of the rail. When the machine is to be removed from the rail, handle 39 is used for this purpose and, by its upward movement, first releases the clamp and frees the machine from the rail so that it can be instantly removed by the same upward movement. The upper end of the clamp member 25 is provided with a socket at 33 to receive the projecting end of shaft 32 and thus hold 25 in alignment. The elevation of plate 21, relative to the rail head is adjusted by the screw 41.

Machine mounting

The holes in the ball of the rail, according to present practice, are drilled about three inches apart, or an inch and a half from the end of each rail at the joint. The drilling mechanism is mounted on the clamp so that without changing the clamp on the rail the drill may be positioned to drill holes spaced to this extent. This is secured by providing an engaging slide or track between the clamp mechanism and the drilling mechanism and locking these parts together during the drilling operation. The clamping plate 21 is formed in a jaw at the top as indicated at 42 and it is provided with a grooved track as indicated at 53a on top of the rail. The frame of the machine, which supports 11 and the drill head, is indicated at 51 and is provided with an extension 52, secured to the upper frame or gear case 11. This frame has formed integral therewith plate 51a parallel with 21, engaging the jaw 42 at the top and having matched grooves to engage the teeth 53a on the clamp member 21. This provides for the longitudinal movement of the machine relative to 21. The extent of movement of the frame 51, relative to 21, is limited by the adjustable stops 154a and 154b provided at each end of plate 21 as indicated in Fig. 2.

The machine is locked to the clamping member by a cam and eccentric as indicated in Figs. 1a and 1b. The plate 21 is provided with a horizontal slot at 46 to receive the locking plate 47 which is mounted upon guides 48 secured to 51a. A cam slot 49b is provided in this plate and the cam 49 is connected by shaft 50 with the operating handle 50a. In the slot 49b the cam 49 is mounted, having an inclined face 49a engaging a corresponding incline on 47 as indicated in Fig. 1b, so that by rotating handle 50a plate 47 is forced away from plate 51a, thereby causing a locking engagement between 51a, the jaw 42 and the grooved teeth 53a of the frame 51, this enables the drilling mechanism to be locked to the clamping mechanism at any position within the limits of the stops 154a and 154b. When locked in position, the frame 51 is fixed relative to the rail.

In the feeding mechanism hereafter to be described, the hand wheel 90 is used to bring the point of the drill 18 tightly against the rail head before the drilling operations are commenced and the mechanism provides for retracting the drill to this original position. In shifting the position of the mechanism, however, to drill the second hole, the point of the drill may not effectively clear the edge of the hole from which it has been withdrawn and, in order to provide proper clearance between the point of the drill and the rail head before the machine is shifted, I provide means for tilting the machine so that the drill point is removed from the rail, this mechanism is embodied in the cam 49 and is operated by lever 50a as the machine is unlocked from the clamp plate 21.

It will be noted that there is a clearance at the top of 51a in the jaw 42 and there is a clearance at the top of the guides 48 in the plate 47, also it will be observed that the cam 49 is eccentrically mounted on shaft 50 so that as the cam 49 is rotated to engage the bottom of the slot 49b the frame 51, with the guides 48 is raised relative to the clamp plate 21. In the normal position it will be noted that the projection 44 on 21 rests in a corresponding depression 45 in the frame 51 and when 51a is raised relative to 21 shoulder 44 engages the frame at 45 and tilts the frame with the drill 18 away from the rail. The ridges 53a in the clamp 21 slope outwardly from the rail to provide a release for the frame as it is tilted by 44. This insures a clearance for the point of the drill from the rail head. When the machine has been positioned for drilling the handle 50a is moved to the locking position which brings the cam 49 into engagement with the top of the slot 49b and thereby forces the machine into the normal position with the teeth 53 in full engagement.

Rotating drill head

Figures 4, 4A, 4B:
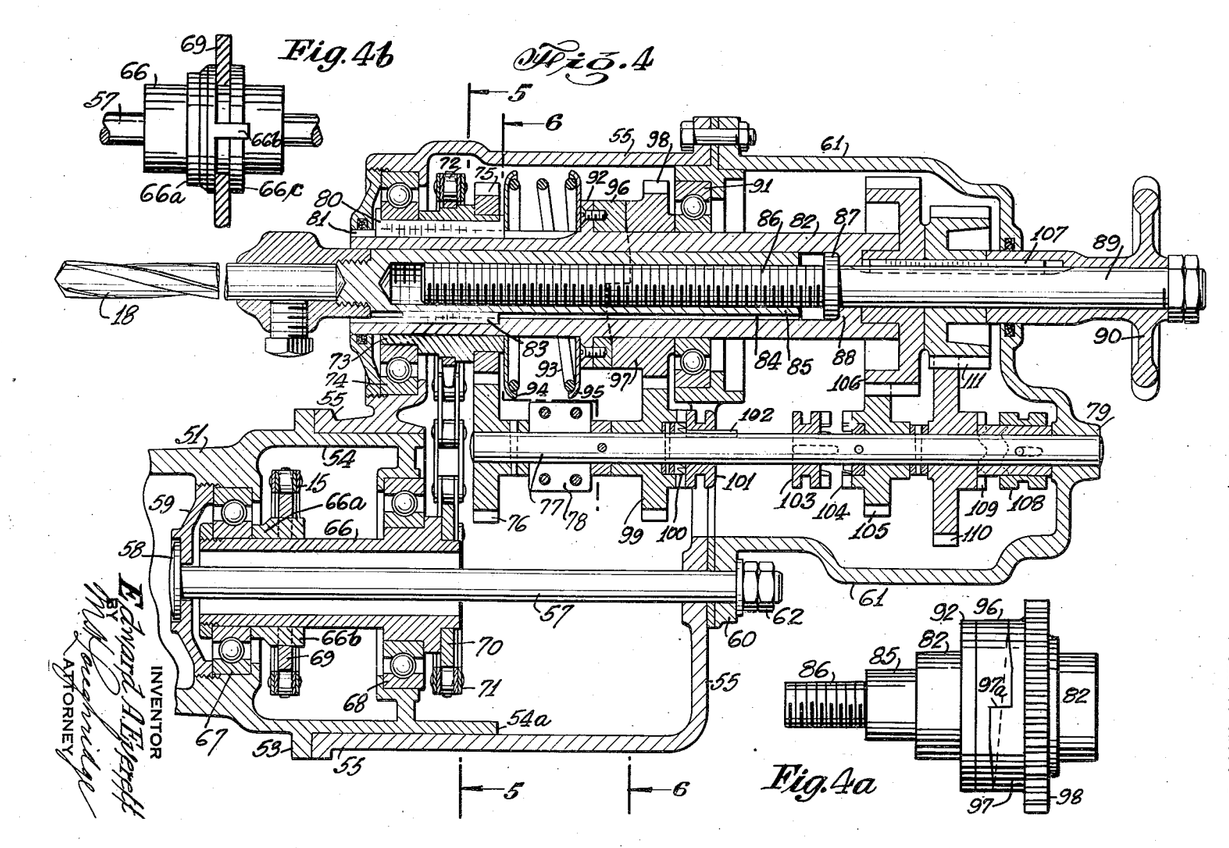
Fig. 4 is a cross section of the drill head, feeding mechanism and driving mechanism.
Fig. 4a is an elevation of part of the drill spindle showing the feeding cam.
Fig. 4b is a detail of the drive sleeve.

The fixed part of the frame 51 is provided with a cylindrical member 54 having a flange 53, Fig. 4 which forms a bearing for the frame 55 of the drill head and about which the drill head rotates. The drill head is held on the cylindrical member 54, by the central bolt 57 having the head 58 engaging the cap 59 and provided with the nuts at 62 clamping the frame 55 and 61 in position and leaving the drill head free to rotate about 57 as a center. The drill head is clamped in position against the flange 53 on member 54 by the handle 63 Fig. 1, which clamps together the lugs 64 and 65 on a split portion of the frame 55 where it is mounted on 54, thus enabling the drill head to be clamped in any operative position.

The sleeve 66 mounted on the ball bearings 67 and 68 rotates about the center of the cylindrical member 54 and has provided thereon the chain or sprocket gear 69 connected by chain 15 with the operating gear 12. A second chain gear 70 mounted on sleeve 66, by chain 71, drives the chain gear 72 of the spindle mechanism. This provides for driving the spindle in any position of the drill head and is independent of the clamping bolt 57.

The spindle

The spindle comprises the outer sleeve 82, the inner sleeve 85, to which the drill 18 is attached and the feed screw 86. These parts move within each other, thereby saving space and length on the machine. The chain wheel 72 is mounted on sleeve 73, rotating on ball bearing 74 and the spur gear 75 is mounted on the inner end of sleeve 73 and engages the spur wheel 76 mounted on shaft 77, rotating on the bearing 78 and in the frame at 79 to operate the feeding mechanism hereafter to be described.

The sleeve 73, by the key 80, and the spline 81 rotates the outer sleeve 82 of the spindle and this sleeve, by key 83, sliding in the keyway 84, rotates the inner sleeve 85, carrying the drill 18 and thus providing the rotary motion for the drill. The inner sleeve 85 is threaded on the screw 86 which has a collar 87 engaging a shoulder at 88 in the outer sleeve 82 and the stem of screw 86 is continued at 89 to support the hand wheel 90. It will be noted that the hand wheel 90 moves the inner sleeve 85, as it is rotated to bring the drill 18 up to the drilling position and without interfering with the drive of the drill through the chain gear 72. This is secured by the engagement of the collar 87 with the shoulder 88 within the spindle mechanism.

The drill feed

The shaft 77, which is connected with the driving mechanism, has loosely mounted thereon the spur gear 99, engaging the spur gear 98, mounted on the outer sleeve 82 of the spindle and engaging the ball bearing 91 mounted in the frame on one side and having its opposite face formed in a step-cam as indicated at 97, with the step 97a formed thereon, Fig. 4a. A complementary cam member 96 engages 97 and on its opposite face is secured to the shoulder 92 formed on the outer sleeve 82 of the spindle. A pair of discs 94 and 95 engage the coil spring 93 which provides a bias to the outer sleeve 82 opposing the forward movement caused by the cam 96—97 and retracting the drill immediately that the stepping position of the cam is reached. Thus, the drill is urged forward for a predetermined number of revolutions of the drill spindle until the cam 97 has made one complete revolution with respect to cam 96 when the drill is automatically retracted. The spur gear 99 is rotated with shaft 77 by means of a clutch 100 connected with clutch member 101 splined to shaft 77 by 102. The operation of 101 will be described hereafter. It should be noted that in a hand operated machine, the retraction of the drill by the step cam is at once apparent to the operator who stops the operation of the machine.

Loosely mounted on the shaft 77 is the spur gear 105 but which may be rotated with shaft 77 by the clutch member 103 when brought into engagement with the clutch 104. The spur gear 105 engages the spur gear 106 which is splined at 107 to the stem 89 of the feed screw 86. This has the effect of rotating the feed screw 86 at a slower rate of speed than the drill spindle 82 which causes the screw 86 to feed the drill 18 to the work by the screw action and which is not limited in the extent of the feed except by the length of screw 86. This provides a screw feed for the drill alternative to the cam feed obtained by the cams 96 and 97.

It is necessary to withdraw or retract the drill after the drilling operation is completed, or as may be necessary in cases of emergency when the drill should be quickly removed from the track. For this purpose the spur wheel 110 normally loosely mounted on shaft 77 but connected to operate with the shaft by the clutch member 108 and the clutch 109, engages the spur gear 111, splined at 107 to the stem 89 of the screw 86. The gear 110 being larger than 111, the spindle 86 is rotated much faster than the outer spindle 82 with the result that the screw withdraws the drill 18 instead of feeding the drill to the work.

A drilling machine operated by a feed screw on this plan is disclosed in U. S. Patent 1,073,281, issued to Cook and a cam operated retracting feed mechanism is disclosed in my co-pending application 665,737, filed April 12, 1933.

Change-over for drill feed

Figures 3, 8, 9:
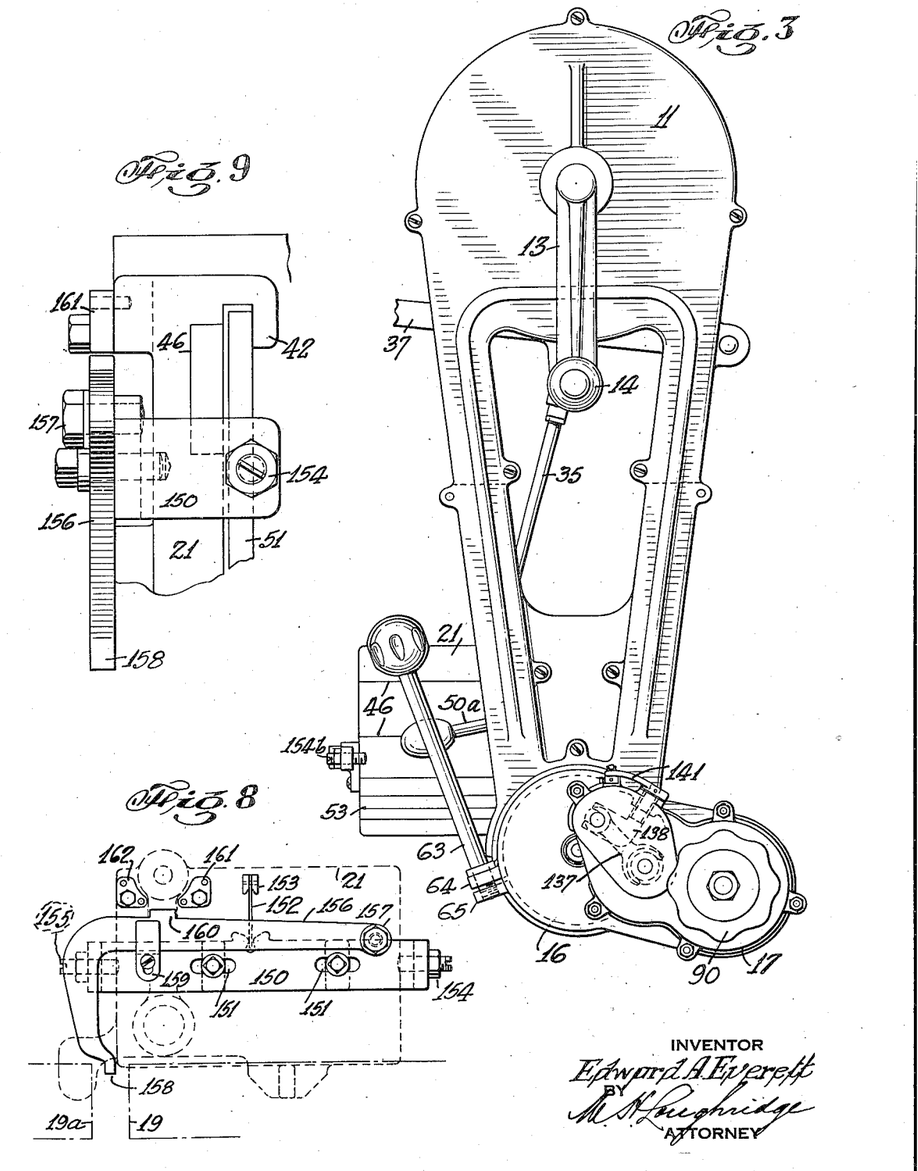
Fig. 3 is an elevation from the mechanism side being the reverse of Fig. 2.
Fig. 8 is a front view of the gauging attachment for positioning the machine longitudinally on the rail.
Fig. 9, is an enlarged end view of the mechanism indicated in Fig. 8.
Figures 5, 6, 7, 7A:
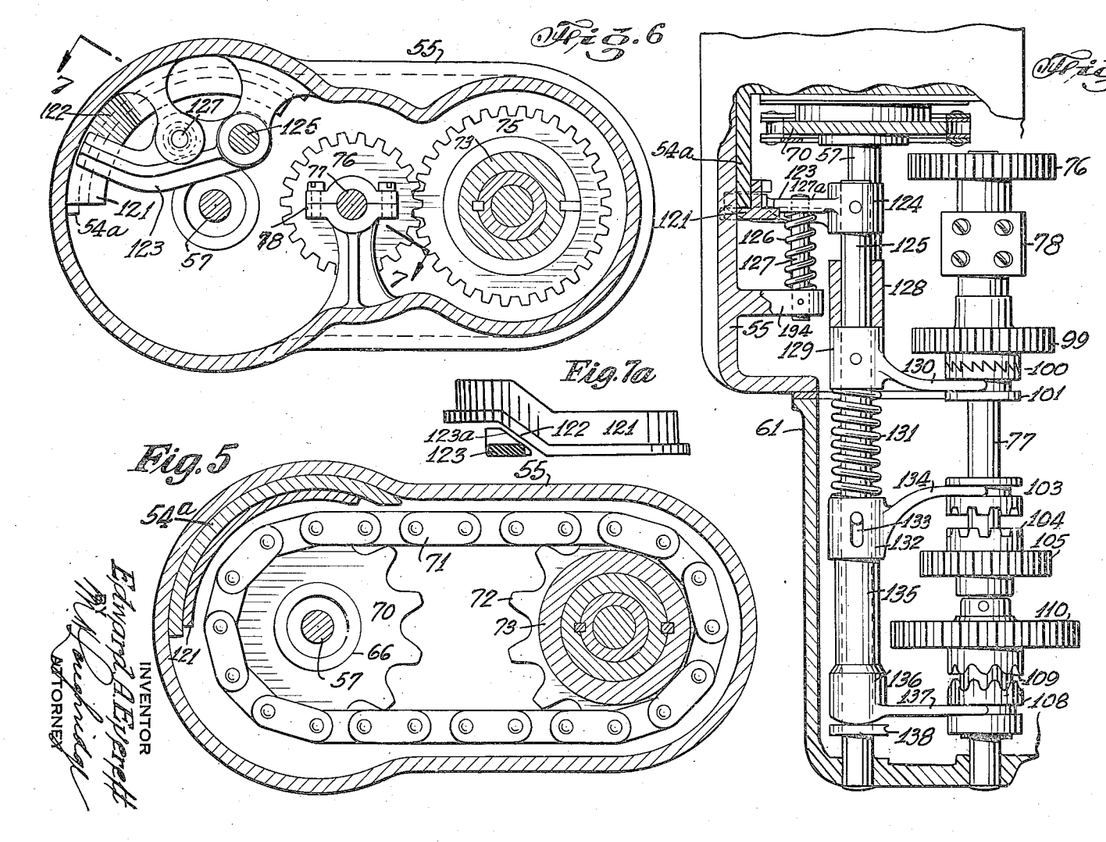
Fig. 5 is a cross section on line 5—5, Fig. 4.
Fig. 6 is a cross section on line 6—6, Fig. 4.
Fig. 7 is a view of the drill head, partly sectioned, on line 7—7, Fig. 6, showing the clutches for changing over the operation of the feed mechanism.
Fig. 7a is a detail showing the cam action used in Fig. 7.

It has been pointed out that when the drill is positioned to drill the ball of the rail as in Figs. 1, 2 and 3, that a comparatively shallow hole is required, it has also been pointed out that the drill head may be swung downwardly on the socket 54 to align the drill with the web of the rail to drill a hole in the position c—c, Fig. 1, and this hole is deeper or longer than the hole in the head of the rail. By a cam action, as illustrated in Figs. 6, 7 and 7a the operation of the drill is changed when moved from the upper to the lower position to drill the deeper hole in the lower position. This mechanism is so adjusted that variations in the height of the drill when drilling the web of the rail or when drilling the head of the rail do not affect the change-over mechanism.

The socket 54, Fig. 4, has an extension 54a to which the cam member 121, Figs. 7 and 7a, is secured. This cam member remains fixed relative to the arm 123, carried by the drill head 55 as it is rotated about 57. The incline 122 of the cam 121 engages the incline 123a of the arm 123 which is projected from the socket 124 on the shaft 125, slidably mounted on the bearing 128 and which is retracted by the coil spring 126, mounted on stud 127 in the arm 194 of the casing 55, the arm 123 is provided with an aperture 127a, which slides on the stud 127. The sleeve 129 carrying the clutch arm 130 is mounted on shaft 125 and in the normal position engages the clutch 100 to rotate the gear 99 with the shaft 77. At the same time the clutches 103 and 108 stand disengaged. This feeds the drill by the cam action corresponding with the upper position of the drill head.

When the drill head is rotated to the lower position, the cam 121 moves the arm 123 against the spring 126 and thereby moves shaft 125 to disengage the clutch 100 and after the clutch 100 is disengaged, clutch 103 is brought into engagement by 104 through the clutch arm 134 and the sleeve 132 connected with the shaft 125 by the pin in slot 133 and by spring 131. The lost motion obtained by means of slot 133 and spring 131 prevents damage to the mechanism if the teeth of the clutch 104 fail to register when the arm 134 is moved over by cam 121.

The retraction of the drill either when the screw feed or the cam feed is in operation is obtained by the clutch 108 which is operated from the handle 39, Fig. 2, by the lever 144, connected by the flexible wire 143 with the drill head, Fig. 1, which by connection 142 operates the crank 141, Fig. 3, which, in turn, operates the arm 138 abutting the sleeve 136 having the clutch arm 137 operating the clutch member 108. The sleeve 136 slides on shaft 125 and is connected by a sliding sleeve 135 with the sleeve 132 so that as the sleeve 136 is moved to engage the clutch 108—109, the clutch 103 is at the same time disengaged by moving the sleeve 132 on the slot 133 and compressing spring 131. This prevents any possibility of the forward and retracting movement of the drill being connected up at the same time. Connecting the clutch 108 rotates the screw 86 at a higher speed than the drill and thereby causes the withdrawal of the drill as previously described. It will be observed that with the apparatus in the normal position as in Fig. 4, the hand wheel 90 is free to be rotated to bring the drill point against the rail before the drilling operation is started, thus the feed cams 96 and 97 drill a hole the depth of which is measured from the position of the point of the drill in contact with the rail.

*Gauging position of drill from rail end*

In the application of this machine for drilling the ball of the rail, in some cases it will be found that the rail joints are comparatively tight, while in other cases it will be found that there is a considerable gap between the ends of the abutting rails, and in order to drill each rail a uniform distance from the end, a gauging attachment as indicated in Figs. 8 and 9 may be applied to the machine. This attachment is secured to the clamping mechanism and acts as a stop for the longitudinal movement of the machine relative to the clamping plate determined by the ends of the rails.

In applying the gauging device the stop members 154a and 154b are removed and in their place is mounted a sliding bar 150 secured by bolts in the slots 151 to the clamping plate 21 and automatically centered by the centering spring 152 secured at 153 to the plate 21. The ends of the bar 150 are turned over to receive the stop screws 154 and 155 which are engaged by the frame 51 in its extreme positions. Gauge bar 156 is pivoted to the bar 150 at 157 and has a depending end 158 which enters the space between the rail ends as indicated at 19 and 19a. This gauge bar is held in position by the cleat 159.

When the end 158 drops into a wide gap between the rails and the drilling mechanism is moved to its extreme position towards the right until the stop 154 is engaged, the bar 150 slides on the slots 151 until it is stopped by 158 engaging the end of the rail 19 and when the drilling machine is moved towards the left to engage stop 155, 158 engages end of rail 19a, thereby insuring that the drill is uniformly spaced from the rail ends without changing the clamping mechanism on the track.

When the rail joints are close the gauge bar is raised from the engaging position between the rails until the end 158 rests upon the top of the rail when the projection 160 fits between the stops 161 and 162, thereby holding the bar 150 in the central position and the bar 156 may be retained in this position by raising the cleat 159 on its slotted support. When 158 rests upon or is raised above the rail head in the centralized position it indicates the position to apply the clamp to the rail.

In Fig. 4b, a method of mounting the chain wheel 69 on sleeve 66 is shown to facilitate assembly. The mounting 66a slides on sleeve 66 and has a key 66b entering a slot in collar 66c, a keyway being provided in 69 for 66b. This construction enables the sleeve 66 to be inserted in the mounting 66a and keyed to sprocket wheel 69 and the assembly is held in place by the nut on the outer end of sleeve 66 engaging the bearing 67. The hollow sleeve provides for the independent rotation of the head about the clamping bolt 57 and enables the head to be removed from the frame 51 by removing bolt 57 and chain 71, while the drive part of the mechanism associated with sleeve 66 remains in place in the frame.

In the mechanism as described a rail clamp of the form shown but not operated by the lifting lever of the machine is shown in the Coulter Patent 1,016,477 and a drilling machine, with a drill head, movable about a fixed support is shown in the Everett Patent 1,408,872 of May 7, 1922.

The drilling machine of the present invention is adapted to the double purpose of drilling the head of the rail and of drilling the web of the rail for bonding purposes. In practice a railroad may adapt bonds for the head of the rail as a standard, but occasionally it will be found necessary to apply bonds or connections to the web of the rail. This arises at locations where the connections are made to the wires of the track circuit and also to bonds at switches and frogs. On the other hand, a railroad may be using bonding in the web of the rail and have occasion to connect up with a portion of track using bonds in the head of the rail. Without a machine adapted for drilling for both types of bonding, it would be necessary to provide two machines, one for each purpose, to do the work of the machine of this invention. This would not only double the cost of the drilling machines, but additional labour would be necessary to handle the extra machine and there would be the inconvenience of getting each machine to the location required on the track.

By controlling the feed of the drill when the drill head is changed to drill the head of the rail to limit the depth of hole, it is impossible for the operator to inadvertently over-drill this hole.

The drill spindle is self contained within the outer sleeve and the thrust of the feed screw is taken up by the internal shoulder of the outer sleeve, instead of through the mechanism frame, as is usual in drill feeding mechanisms.

The drilling machine as disclosed in the drawings is shown as intended for manual operation, it is constructed with anti-friction bearings and it is made as light as possible so that it is readily portable and can be operated by one man. A motor may be used for operating this drill instead of the manual operation when desired.

The invention as herein disclosed admits of a variety of applications in addition to those illustrated and described and is not to be confined to the specific structure shown.

Having thus described my invention, I claim:

1. In a drilling machine for drilling railway rail, the combination, a frame clamped to the rail, a drill head pivotally mounted on said frame, a drill spindle with a drill in said head located at right angles to the rail as the head pivots on its mounting, the drill being located to drill the head or to drill the web of the rail by moving said head on its pivot, a drive shaft for the drill spindle in said frame, a drive wheel splined on said spindle, means operatively connecting said shaft with said wheel, a counter shaft driven with said spindle, a fixed cam member on said drill spindle, a complementary cam member centered on the drill spindle for feeding the drill to drill a predetermined depth of hole, means including a clutch operatively connecting said complementary cam member with said counter shaft and means controlling the engagement of said clutch by the movement of said drill head on its pivot.

2. In a drilling machine for drilling railway rail, the combination, a frame clamped to the rail, a drill head pivotally mounted on said frame, a drill spindle with a drill in said head located at right angles to the rail as the head pivots on its mounting, the drill being located to the work by moving said head on its pivot, a drive sleeve for the drill spindle in said frame, a bolt in said sleeve securing said head to said frame, a drive wheel splined on said spindle, means operatively connecting said sleeve with said wheel, a counter shaft driven with said spindle, a fixed cam member on said spindle, a complementary cam member engaging said fixed cam member for feeding the drill to drill a predetermined depth of hole, means including a clutch operatively connecting said complementary cam member with said counter shaft, a sliding shaft operating said clutch and a cam operated by the movement of said drill head on its pivot for sliding said shaft.

3. In a drilling machine for drilling railway rail, the combination, a frame clamped to the rail, a drill head pivotally mounted on said frame, a drill spindle with a drill in said head located at right angles to the rail as the head pivots on its mounting, the drill being located to drill the head or to drill the web of the rail by moving said head on its pivot, a drive shaft for the drill spindle in said frame, a drive wheel splined on said spindle, means operatively connecting said shaft with said wheel, a counter shaft driven with said spindle, an exterior shoulder on said spindle, a cam member centered on said spindle and engaging said shoulder for feeding the drill to the work to drill a predetermined depth of hole, a spring opposing said cam, means including a clutch operatively connecting said cam with said counter shaft and means controlling the engagement of said clutch by the movement of said drill head on its pivot.

4. In a drilling machine for drilling railway rail, the combination, a frame clamped to the rail, a drill head pivotally mounted on said frame, a drill spindle with a drill in said head, located at right angles to the rail as the head pivots on its mounting, the drill being located to drill the head or to drill the web of the rail by moving said head on its pivot, a drive shaft for the drill spindle in said frame, a drive wheel splined on said spindle, means operatively connecting said shaft with said wheel, a counter shaft driven with said spindle, a step cam centered on said spindle comprising a member secured to and rotating with the spindle and a complementary member for feeding the drill for a predetermined depth of hole, means operatively connecting said complementary member with said counter shaft, a spring opposing the movement of said spindle by said cam and means controlling said connection by the movement of said drill head on its pivot.

5. In a drilling machine for drilling railway rail, the combination, a frame clamped to the rail, a drill head pivotally mounted on said frame, a drill spindle with a drill in said head located at right angles to the rail as the head pivots on its mounting, a drive for said spindle, a counter shaft driven with said spindle, a screw for feeding the drill to the work, a first set of gears and a first clutch connecting said screw with said counter shaft for rotating the screw at one speed relative to the spindle, a second set of gears and a second clutch connecting said counter shaft with said screw for rotating the screw at a different speed relative to the spindle and means operated by pivotal movement of said drill head for co-operatively operating said clutches so that when one clutch is engaged the other clutch is disengaged.

6. In a drilling machine for drilling railway rail, the combination, a frame clamped to the rail, a drill head pivotally mounted on said frame, a drill spindle with a drill in said head, located at right angles to the rail as the head pivots on its mounting, a drive for said spindle, a counter shaft driven with said spindle, a screw for feeding the drill to the work, a first set of gears and a clutch connecting said screw with said counter shaft to operate at one speed relative to the spindle, a second set of gears and a clutch connecting said screw with said counter shaft to operate at another speed, means for operating one of said clutches by the movement of the drill head on its pivot, means for manually operating the other clutch and means preventing both of said clutches being brought into engagement at the same time.

7. In a drilling machine for drilling railway rail, the combination, a frame clamped to the rail, a drill head pivotally mounted on said frame, a drill spindle with a drill in said head located at right angles to the rail as the head pivots on its mounting, a drive for said spindle, a counter shaft driven with said spindle, a cam engaging said spindle for feeding the drill to the work to drill a predetermined depth of hole, a hollow sleeve in said spindle carrying a drill, a screw engaging said sleeve for feeding the drill to the work to a greater extent than the feed by said cam, means including a first clutch operatively connecting said cam with said counter shaft, means including a second clutch operatively connecting said screw to said counter shaft and means operated by the movement of said drill head on its pivot for engaging one of said clutches and disengaging the other clutch.

8. In a drilling machine for drilling railway rail, the combination, a frame clamped to the rail, a drill head pivotally mounted on said frame, a drill spindle with a drill in said head located at right angles to the rail as the head pivots on its mounting, a drive for said spindle, a counter shaft driven with said spindle, a cam engaging said spindle for feeding the drill to the work, a screw engaging said spindle for feeding the drill to the work and for retracting the drill from the work, means including a first clutch connecting said cam to said counter shaft, means including a second clutch connecting said screw to said counter shaft to feed the drill to the work, means including a third clutch connecting said screw to said counter shaft to retract the drill from the work by increasing the speed of the drill relative to the drive and means for operating a pair of said clutches by the movement of said drill head on its pivot.

9. In a drilling machine for drilling railway rail, the combination, a frame clamped to the rail, a drill head pivotally mounted on said frame, a spindle with a drill in said head located at right angles to the rail as the head pivots on its mounting, a drive for said spindle, a counter shaft driven with said spindle, a cam engaging said spindle for feeding the drill to the work to drill a predetermined depth of hole, a screw engaging said spindle for feeding the drill to the work to a greater extent than the feed by said cam, means including a first clutch connecting said cam to said counter shaft, means including a second clutch connecting said screw to said counter shaft, a shaft operating said clutches to engage one clutch and simultaneously disengage the other clutch and a cam operated by the pivoted movement of the drill head for operating said shaft.

10. A drilling machine having the combination, a frame, a drill head pivotally mounted in said frame, a drill spindle with a drill in said head located at right angles to the work as the head pivots on its mounting, a drive shaft for said spindle, a drive wheel splined on said spindle, means operatively connecting said shaft with said drive wheel, a counter shaft driven with said spindle, a cam on the outside of said spindle and centered on said spindle for feeding the drill to the work to drill a predetermined depth of hole, a screw in the centre of said spindle for feeding the drill to the work to a greater extent than the feed by said cam, means including a first clutch connecting said cam to said counter shaft, means including a second clutch connecting said screw to said counter shaft and means operated by the movement of the drill head on its pivot for engaging the first clutch and releasing the second clutch when the drill head is in one position and for engaging the second clutch and releasing the first clutch when the drill head is in another position.

11. In a drilling machine, the combination, a frame, a spindle with a drill in said frame, a drive for said spindle, a counter shaft driven with said spindle, a cam engaging said spindle for feeding the drill to the work, to drill a predetermined depth of hole, a screw engaging said spindle for feeding the drill to the work to a greater extent than the feed by said cam, means including a first clutch connecting said cam to said counter shaft, means including a second clutch connecting said screw to the counter shaft, a shaft with an arm fixed thereon for operating one of said clutches, a second arm for operating the other clutch mounted on said shaft with a lost motion connection and connected with the first arm by a spring.

12. A drilling machine having the combination, a frame, a spindle with a drill in said frame, a drive for said spindle, a counter shaft driven with said spindle, a cam engaging said spindle for feeding the drill to the work, a screw engaging said spindle for feeding the drill to the work, and for retrieving the drill from the work, means including a first clutch engaging said cam with said counter shaft, means including a second clutch for connecting said screw with said counter shaft for feeding the drill to the work, means including a third clutch for connecting said screw with said counter shaft for retrieving the drill, means for operating said clutches and means whereby engaging the third clutch disengages the second clutch without regard to the condition of the first clutch.

13. A drilling machine for drilling railway rail, having the combination, a frame clamped to the rail, a drill head pivotally mounted on said frame, a spindle with a drill in said head located at right angles to the rail as the head pivots on its mounting, a drive for said spindle, a counter shaft driven with said spindle, a cam engaging said spindle for feeding the drill to the work to drill a predetermined depth of hole, a screw engaging said spindle for feeding the drill to the work and for retrieving the drill from the work, means including the first clutch engaging said cam with said counter shaft, means including a second clutch for connecting said screw with said counter shaft for feeding the drill to the work to a greater extent than the feed by said cam, means including a third clutch for connecting said screw with said countershaft for retrieving the drill and manually operated means for engaging the third clutch and disengaging the second clutch.

14. A drilling machine for drilling railway rail having the combination, a frame clamped to the rail, a drill head pivotally mounted on said frame, a drill spindle with a drill in said head located at right angles to the rail as the head pivots on its mounting, a drive shaft for said spindle, a counter shaft driven with said spindle, a cam on the spindle for feeding the drill to the work to drill a predetermined depth of hole, a screw in the spindle for feeding the drill to the work to a greater extent than the feed by said cam, means including a clutch connecting said cam with said counter shaft, means including a second clutch connecting said screw with said counter shaft, a sliding shaft with clutch arms engaging said clutches and a cam on said pivoted drill head engaging said sliding shaft to shift said clutches.

15. A drilling machine for drilling railway rail having the combination, a frame clamped to the rail, a drill head pivotally mounted on said frame, a spindle with a drill in said head located at right angles to the rail as the head pivots on its mounting, a drive for said spindle, a counter shaft driven with said spindle, a cam engaging said spindle for feeding the drill to the work to drill a predetermined depth of hole, a screw engaging said spindle for feeding the drill to the work to a greater extent than the feed by said cam, means including a first clutch connecting said cam with said counter shaft, means including a second clutch connecting said screw with said counter shaft, means for operating said clutches to change from the cam to the screw feed and manual means for operating said screw to position the drill.

16. In a drilling machine for drilling railway rail, the combination, a frame clamped to the rail, a drill head pivotally mounted on said frame, a drill spindle in said head located at right angles to the rail as the head pivots on its mounting, said spindle comprising an outer sleeve, an inner sleeve splined to the outer sleeve and to which the drill is attached and a feed screw threaded in said inner sleeve, a splined drive for said outer sleeve, a step cam on said outer sleeve for feeding the drill to the work to drill a predetermined depth of hole by moving said outer sleeve on said frame, a spring for retrieving said outer sleeve, means for operating said cam by said drive, means for operating said screw by said drive to feed the drill to the work to a greater extent than the feed by said cam and means for operating said feed screw at a speed that retracts the drill.

17. In a drilling machine for drilling railway rail, the combination, a frame clamped to the rail, a drill head pivotally mounted on said frame, a drill spindle in said head located at right angles to the rail as the head pivots on its mounting, said spindle comprising an outer sleeve with an external and an internal shoulder, a splined drive for said outer sleeve, an annular step cam rotating on said outer sleeve and engaging said shoulder and said frame for feeding the spindle to the work to drill a predetermined depth of hole, an inner sleeve carrying the drill splined on said outer sleeve and internally threaded, a feed screw having a collar engaging the internal shoulder of said outer sleeve and threaded in said inner sleeve, a spring opposing the feed movement of said spindle, means for operating said cam by said drive and means for operating said screw by said drive to feed the drill to the work to a greater extent than the feed by said cam and to retract the drill from the work.

18. In a track drilling machine, the combination, a frame secured to the track rail, a drill head with a drill pivotally mounted on said frame to position the drill for drilling the ball of the rail and for drilling the web of the rail, a spindle in said drill head carrying the drill, a splined drive for said spindle, a cam engaging said spindle for feeding the drill to the work, a screw engaging said drill for feeding the drill to the work, means including a first clutch for driving said cam with said spindle and means including a second clutch for driving said screw with said spindle and means for controlling said clutches by the movement of said drill head on its pivot so that the clutch operating the cam is engaged when the drill is positioned to drill the ball of the rail and the second clutch is engaged when the drill head is positioned to drill the web of the rail.

19. In a track drilling machine, the combination, a frame secured to the rail, a drill head with a drill pivotally mounted on said frame to position the drill for drilling the ball of the rail and for drilling the web of the rail, a spindle in said drill head carrying the drill, a splined drive for said spindle, a cam engaging said spindle for feeding the drill to the work for a predetermined depth of hole only, means engaging said drill for feeding the drill to the work for an unlimited depth of hole, means including a first clutch for driving said cam with said spindle, means including a second clutch for driving said feeding means with said spindle, means controlling said clutches by the movement of said drill head on its pivot so that the first clutch is engaged when the drill is set for drilling the ball of the rail and the second clutch is engaged when the drill is set for drilling the web of the rail.

20. In a track drilling machine, the combination, a frame, secured to the rail, a drill head with a drill pivotally mounted on said frame to position the drill for drilling the ball of the rail and for drilling the web of the rail, a spindle in said drill head carrying the drill, a splined drive for said spindle, a cam engaging said spindle for feeding the drill to the work, a spring for retrieving said spindle, a second feeding means for feeding the drill to the work, means for retrieving the drill from the second feeding means, means including a first clutch for driving said cam with said spindle, means including a second clutch for driving said second feeding means with said spindle and means controlling said clutches by the movement of said drill head on its pivot so that the first clutch is engaged when the drill is set for drilling the ball of the rail and the second clutch is engaged when the drill is set for drilling the web of the rail.

21. In a track drilling machine for drilling railway rail, the combination, a frame secured to the track rail, a drill head pivotally mounted on said frame, a drill spindle with a drill in said head located at right angles to the rail as the head pivots on its mounting, means for driving said spindle, a cam for feeding said drill to the work to drill a predetermined depth of hole, a screw for feeding and for retrieving said drill, means including a first clutch for driving said cam with said spindle, means including a second clutch for driving said screw to feed the drill by said driving means to a greater extent than the feed by said cam, means associated with said pivoted head for operating said clutches and means for driving said screw at a speed relative to said spindle that retrieves the drill when the first clutch is engaged.

22. A drill spindle for a drilling machine comprising an outer sleeve having an exterior shoulder and an interior shoulder, a spline for driving said spindle, a cam engaging said exterior shoulder for feeding the drill to the work to drill a predetermined depth of hole, a spring opposing said cam, an inner sleeve splined on said outer sleeve having an axial thread and carrying the drill, a screw having a collar engaging the interior shoulder of said outer sleeve threaded in said inner sleeve and means connected with the spindle drive for rotating said screw to feed the drill to the work to a greater extent than the feed by said cam and for rotating said screw at a speed relative to the spindle that retrieves the drill from the work.

23. A drilling machine comprising a frame having a cylindrical member having an annular flange forming a bearing fixed with relation to the work, a drill head pivotally mounted on said bearing against said flange and having a drill and a feeding mechanism for the drill, a sleeve with a collar thereon mounted for rotation in the centre of said cylindrical frame member, a bolt in said sleeve securing said head to said frame member, a wheel mounted on said sleeve against said collar, said wheel and collar being provided with slots in register with each other and a second collar on said sleeve having keys entering the slots in said wheel and collar for securing the wheel to rotate with the sleeve, and means for driving said drill by said sleeve and for operating said feeding mechanism, said drill head being moved on its pivot to position the drill to the work.

24. A rail drilling machine for drilling the head and the web of a railway rail, comprising a cylindrical support secured to the rail, a driving member located in the centre of said cylindrical support at right angles to the rail, a drill head with a drill mounted to pivot on said cylindrical support to locate the drill for drilling the head or the web of the rail, a drill spindle for said drill, means for driving said drill spindle by said driving member, means connected with said spindle for feeding said drill to a limited extent for drilling the head of the rail, and a second means connected with said spindle for feeding said drill to a greater extent for drilling the web of the rail, a cam on said support and means operated by the pivotal movement of the drill head engaging said cam for selectively making one of said feeding means effective at a time.

25. A rail drilling machine for drilling the head and the web of a railway rail, comprising a cylindrical support secured to the rail, a driving member located in the centre of said cylindrical support, a drill head with a drill spindle and drill pivotally mounted on said cylindrical support whereby the drill is located for drilling the head or the web of the rail, means for driving said drill spindle by said driving member, means for feeding said drill to a limited extent for drilling the head of the rail and means for feeding said drill to a greater extent for drilling the web of the rail, a clutch mechanism for connecting either of said feeding means with said spindle without changing the drive and means for operating said clutch mechanism by the pivotal movement of said drill head.

EDWARD A. EVERETT.